(12) United States Patent
Kaneko

(10) Patent No.: US 8,384,884 B2
(45) Date of Patent: Feb. 26, 2013

(54) RANGE FINDER

(75) Inventor: Masanobu Kaneko, Yokohama (JP)

(73) Assignee: Nikon Vision Co., Ltd., Tokyo (JP)

( * ) Notice: Subject to any disclaimer, the term of this patent is extended or adjusted under 35 U.S.C. 154(b) by 0 days.

(21) Appl. No.: 12/714,473

(22) Filed: Feb. 27, 2010

(65) Prior Publication Data

US 2010/0157282 A1    Jun. 24, 2010

Related U.S. Application Data

(63) Continuation of application No. PCT/JP2008/065798, filed on Aug. 27, 2008.

(30) Foreign Application Priority Data

| Sep. 5, 2007 | (JP) | 2007-230499 |
| Sep. 11, 2007 | (JP) | 2007-235741 |
| Sep. 14, 2007 | (JP) | 2007-239687 |

(51) Int. Cl.
    *G01C 3/08* (2006.01)

(52) U.S. Cl. ........... 356/5.01; 356/5.02; 356/5.1

(58) Field of Classification Search ........ 356/3.01–3.15, 356/4.01–4.1, 5.01–5.15, 6–22, 28, 28.5
    See application file for complete search history.

(56) References Cited

U.S. PATENT DOCUMENTS

| 3,634,011 | A | 1/1972 | Scholdstrom | |
| 5,815,251 | A * | 9/1998 | Ehbets et al. | 356/5.01 |
| 6,801,305 | B2 | 10/2004 | Stierle et al. | |
| 6,833,909 | B2 | 12/2004 | Schmidt et al. | |
| 2003/0128351 | A1 | 7/2003 | Schmidt et al. | |
| 2004/0012770 | A1 * | 1/2004 | Stierle et al. | 356/4.01 |
| 2004/0135992 | A1 * | 7/2004 | Munro | 356/4.01 |
| 2005/0275829 | A1 * | 12/2005 | Kumagai et al. | 356/139 |
| 2007/0296979 | A1 * | 12/2007 | Morimoto et al. | 356/609 |

FOREIGN PATENT DOCUMENTS

| GB | 2 233 182 A | 1/1991 |
| JP | 63-244001 A | 10/1988 |
| JP | 63-244001 A | 11/1988 |
| JP | 02-210287 A | 8/1990 |
| JP | 2-210287 A | 8/1990 |
| JP | 2004-198386 A | 7/2004 |

* cited by examiner

*Primary Examiner* — Luke Ratcliffe
(74) *Attorney, Agent, or Firm* — Miles and Stockbridge P.C.

(57) ABSTRACT

A range finder 100 includes a transmission optical system 20 that transmits signal light toward a target object, a detection optical system 30 that has a different optical axis from that of the transmission optical system and detects the signal light reflected from the target object, and a photodetector 12 that is disposed on an imaging surface of the detection optical system. A distance to the target object is measured on the basis of a time difference between a transmission time and a detection time of the signal light. The detection optical system 30 includes a variable focal length optical system 14 that makes the focal length of the detection optical system variable, thereby providing a range finder capable of measuring a distance to a target object that locates from further away to nearer by using a photodetector having the same size.

5 Claims, 14 Drawing Sheets

RANGE FINDER

CROSS-REFERENCE TO RELATED APPLICATION

This application is a continuation of International Application No. PCT/JP2008/065798 filed Aug. 27, 2008.

TECHNICAL FIELD

The present invention relates to a range finder using laser light.

BACKGROUND ART

A range finder that transmits laser light to a target object, detects reflected light, and measures a distance to the target object from time difference between transmission time and detection time has been known (for example, see Japanese Patent Application Laid-Open No. 63-244001). Recently, a range finder has been desired to be able to measure a distance of a nearer object.

However, in the conventional range finder, since an optical axis of the transmission optical system and that of the detection optical system are different, when a distance to a target object locating at a nearer distance is to be measured by using a photodetector having the same size as that of the photodetector used in the conventional one, a spot image of the reflected laser light from the target object is formed out of a detecting area of the photodetector disposed in the vicinity of the imaging surface of the detection optical system, so that the distance of a nearer object capable of being measured has a certain limit.

DISCLOSURE OF THE INVENTION

The present invention is made in view of the above-described problems, and has an object to provide a range finder capable of measuring a distance to a target object that locates from further away to nearer by using a photodetector having the same size as that of the photodetector used in the conventional range finder.

In order to solve the problems, according to a first aspect of the present invention, there is provided a range finder comprising: a transmission optical system that transmits signal light toward a target object; a detection optical system that has a different optical axis from that of the transmission optical system and detects the signal light reflected from the target object; and a photodetector that is disposed on an imaging surface of the detection optical system; and a distance to the target object being measured on the basis of a time difference between a transmission time and a detection time of the signal light; the detection optical system including an image-forming-position-adjusting member that makes an adjustment of an image forming position where the detection optical system forms an image of the signal light reflected by a target object locating at a far distance and an image forming position where the detection optical system forms an image of the signal light reflected by a target object locating at a near distance with respect to the photodetector.

In the first aspect of the present invention, it is preferable that the image-forming-position-adjusting member is a variable focal length optical system that makes a focal length of the detection optical system variable.

In the first aspect of the present invention, it is preferable that the variable focal length optical system includes a zoom optical system that is disposed between an objective lens of the detection optical system and the photodetector.

In the first aspect of the present invention, it is preferable that the variable focal length optical system includes an optical system that is removably disposed between an objective lens of the detection optical system and the photodetector.

In the first aspect of the present invention, it is preferable that the variable focal length optical system includes an optical system that is removably disposed to the object side of an objective lens of the detection optical system.

In the first aspect of the present invention, it is preferable that the following conditional expression is satisfied:

$$(L2/L1) \times fL \leq fS \leq fL$$

where fL denotes the maximum focal length of the detection optical system varied by the variable focal length optical system, fS denotes the minimum focal length of the detection optical system varied by the variable focal length optical system, L1 denotes the maximum distance to an object to be measured, and L2 denotes the minimum distance to an object to be measured.

In the first aspect of the present invention, it is preferable that the image-forming-position-adjusting member is an optical-axis-deflecting optical system that deflects an optical axis of the detection optical system.

In the first aspect of the present invention, it is preferable that the optical-axis-deflecting optical system includes a mirror.

In the first aspect of the present invention, it is preferable that the optical-axis-deflecting optical system includes a deflection angle prism.

In the first aspect of the present invention, it is preferable that the image-forming-position-adjusting member is a photodetector holding mechanism that disposes the photodetector with shifting the center thereof in a direction from the image forming position of the signal light reflected by the target object locating at a far distance to the image forming position of the signal light reflected by the target object locating at a near distance.

In the first aspect of the present invention, the range finder preferably includes a collimation optical system.

The present invention makes it possible to provide a range finder capable of measuring a distance to a target object that locates from further away to nearer by using a photodetector having the same size.

EMBODIMENT FOR CARRYING OUT THE INVENTION

A range finder according to a first embodiment of the present invention is explained with reference to accompanying drawings.

[First Embodiment]

Figure 1:
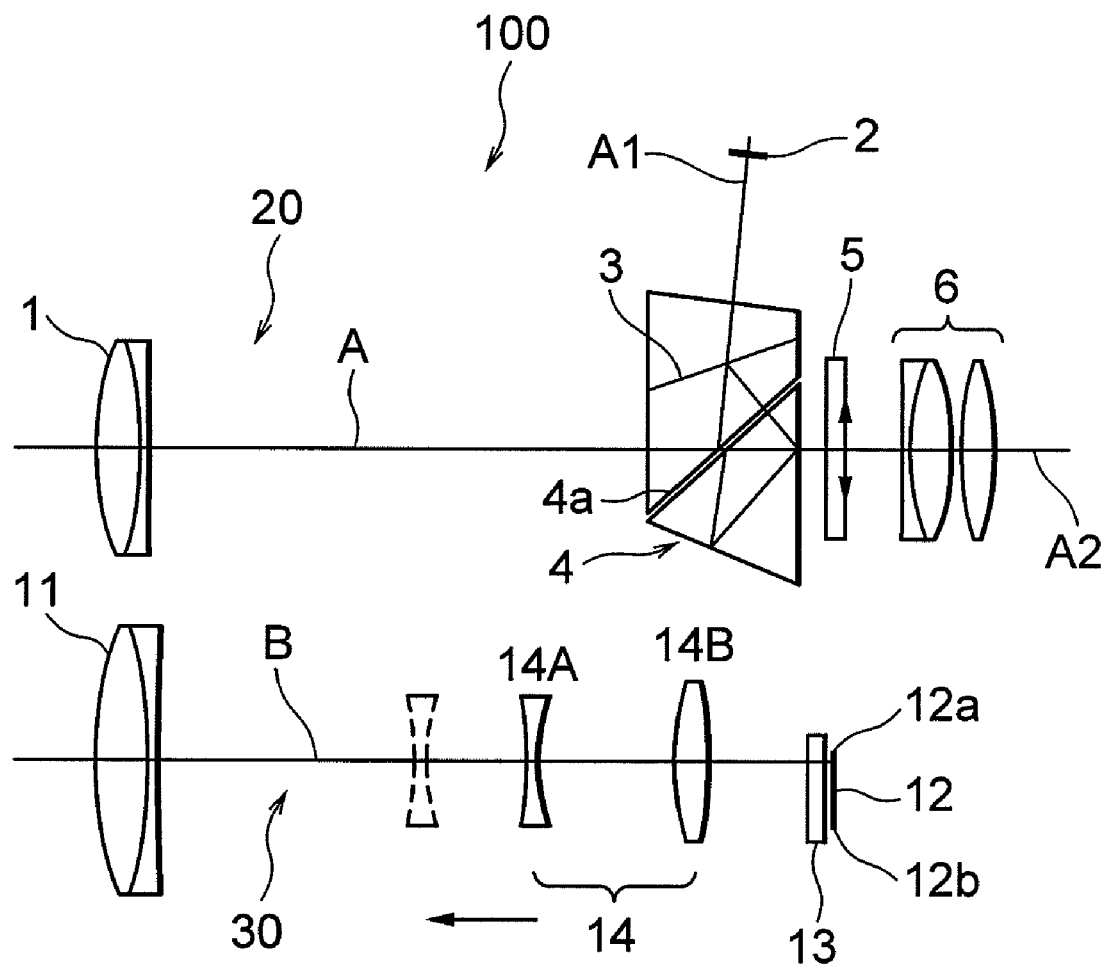
FIG. 1 is a schematic diagram showing an optical system of a range finder according to a first embodiment.
Figure 2:
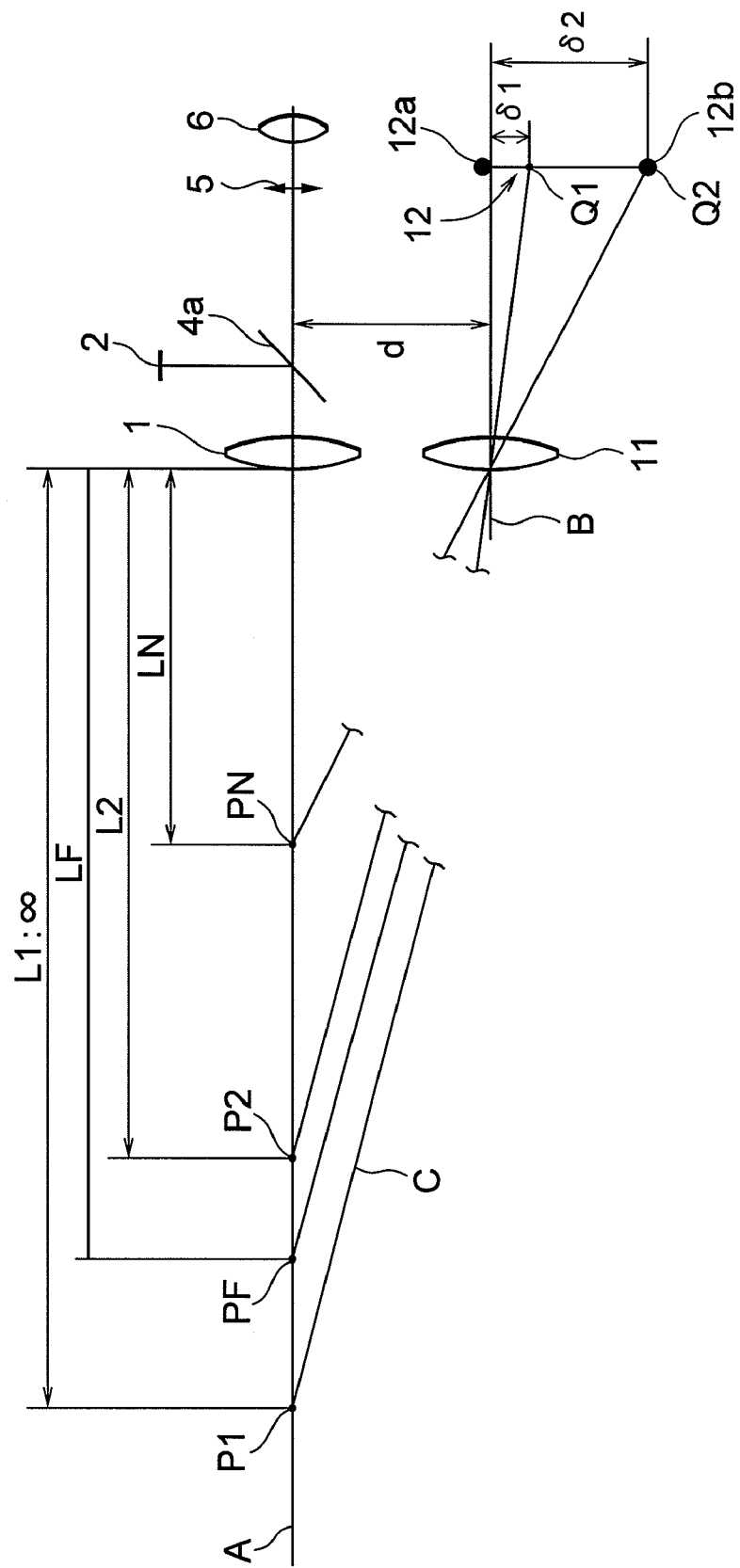
FIG. 2 is a diagram explaining a positional relation of laser spot images from target objects locating different distances on the photodetector of a detection optical system.
Figure 3:
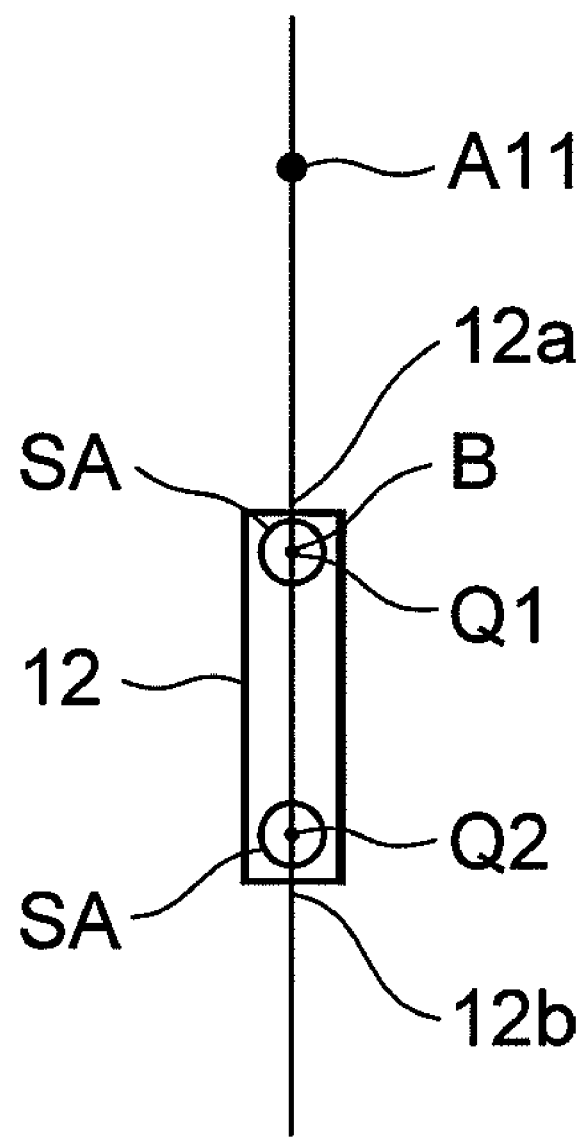
FIG. 3 is a schematic diagram showing each spot image position on the photodetector.

FIG. 1 is a schematic diagram showing an optical system of a range finder according to a first embodiment. FIG. 2 is a diagram explaining an effect of the range finder according to the first embodiment. FIG. 3 is a schematic diagram showing each spot position and the photodetector.

In FIG. 1, the range finder 100 according to the first embodiment is composed of a transmission optical system 20 having a common optical axis A commonly used in an optical axis A2 of a collimation optical system and an optical axis A1 of a transmission optical system, and a detection optical system 30 having an optical axis B different from the optical axis A. In order to simplify the explanation, electronic circuit portions such as a signal light driving circuit, a control circuit, a calculation circuit, and a display are omitted.

Light (hereinafter called as "signal light") emitted from a light source 2 such as a semiconductor laser is emitted along the optical axis A1 of the transmission optical system 20, passes through a dichroic mirror 3 that is provided in an erecting prism 4 for passing the signal light and reflecting visible light, is reflected by a mirror 4a, proceeds to an objective lens 1, and radiates the target object (such as P1, P2, PF, PN in FIG. 2) through the objective lens 1. Incidentally, although the erecting prism 4 is an erecting roof prism, an erecting Porro prism may suitably be used.

The signal light reflected from the target object and visible light from the target object are converged by the objective lens 1, and incident on the erecting prism 4. The signal light is reflected by the mirror 4a on the erecting prism 4, passes through the dichroic mirror 3, and emits to the light source 2 side. In this manner, the transmission optical system is constructed.

Visible light is reflected by each reflecting surface of the erecting prism 4 including dichroic mirror 3, emitted from the erecting prism 4, and forms an image of the target object on a reticle 5. Incidentally, the objective lens 1 is commonly used by the transmission optical system and the collimation optical system.

An indicator such as cross hairs is formed on the reticle 5. Since the transmission optical system and the collimation optical system commonly use the optical axis A, with superposing the image of the target object and cross hairs on the reticle 5 by an eyepiece 6, the target object can be precisely radiated by the signal light. In this manner, the collimation optical system is constructed.

The detection optical system 30 is disposed with a certain distance (d described later) from the common optical axis A of the transmission optical system and the collimation optical system. The signal light and the visible light from the target object pass through an objective lens 11 in the detection optical system, and form a spot image on a photodetector 12 disposed in the vicinity of the image plane of the objective lens 11. In order to remove an effect of background light (noise light) such as sunlight illuminating the target object and being incident on the photodetector 12, a narrow-band filter 13 for transmitting only light having the same wavelength as the signal light and blocking the light having the other wavelengths is provided on the objective lens 11 side of the photodetector 12.

Since the narrow-band filter 13 transmits light having the same wavelength as the signal light, in order to increase a signal-to-noise ratio of the signal light, the dimension of the photodetector 12 preferably has a necessary and sufficient minimum dimension.

A zoom optical system 14 for varying a focal length of the detection optical system 30 is provided between the objective lens 11 and the photodetector 12 of the detection optical system 30. The zoom optical system 14 includes, in order from the objective lens 11 side, a negative lens group 14A and a positive lens group 14B, and the focal length of the detection optical system 30 can be varied by moving the negative lens group 14A along the optical axis B. The focal length may be varied at least two steps by moving the negative lens group 14A in at least two steps, or the focal length may be varied continuously by moving the negative lens group 14A and the positive lens group 14B continuously.

In this manner, the range finder 100 is constructed.

In the range finder 100 according to the first embodiment, as shown in FIGS. 2 and 3, the center position of the photodetector 12 is shifted in a direction from the focusing position of the signal light of a distant object to the focusing position of the signal light of a near object on the imaging surface of the detection optical system 30. In other words, on the imaging surface of the detection optical system 30, the center of the photodetector 12 is shifted such that an end portion 12a of the photodetector 12 is positioned near to the optical axis B, and the other end portion 12b comes away from the optical axis B. With including the zoom optical system 14 into the range finder, the range to be measured can be increased as described later.

Although the photodetector 12 is disposed perpendicular to the optical axis B of the detection optical system 30, it is not necessary to be perpendicular, and the photodetector 12 is preferably disposed with tilting to, for example, the best focus position of the spot image corresponding to the nearest distance.

The position of the photodetector 12 and measurable distance range of the range finder 100 according to the first embodiment will be explained below with reference to FIGS. 2 and 3. The explanation is carried out with attaching the same symbol to the similar configuration as FIG. 1.

In FIG. 2, signal light emitted from a light source 2 is reflected by a mirror 4a, which is disposed in an erecting prism 4, transmits visible light, and reflects signal light, and reaches a target object P1 (the longest measurable distance) through an objective lens 1. The explanation is carried out without illustrating the erecting prism 4 shown in FIG. 1.

The signal light is scattered by the object P1 and a portion thereof is incident on an objective lens 11 of the detection optical system 30. The signal light proceeds along a line C joining the center of P1 and the center of the objective lens 11, forms an image at a point Q1 in the vicinity of the optical axis B on the photodetector 12 disposed near to the imaging surface of the objective lens 11, and a distance to the target object P1 is calculated on the basis of the time difference between the transmission time and the detection time.

When the distance to the object P1 is denoted by L1, an amount of shift δ1 of the point Q1 from the optical axis B is shown by expression (1):

$$\delta 1 = f \times d / L1 \quad (1)$$

where f denotes a focal length of the objective lens 11, and d denotes a distance between the optical axis A and the optical axis B.

When the distance L1 is sufficiently large in comparison with the distance d, d/L1 becomes substantially zero, and δ1 also becomes substantially zero. This means that the point Q1 exists on the optical axis B. Accordingly, in consideration of measuring up to a long distance L1 in comparison with d, one end portion 12a of the photodetector 12 is preferably disposed on the optical axis B. However, when a limit is provided to the distance L1 in consideration of a reaching distance of the signal light or detection intensity of the signal light, the one end portion 12a of the photodetector 12 may be disposed slightly away from the optical axis B in accordance with expression (1).

On the other hand, when a distance to an object P2 locating at a near distance L2 is to be measured, a position where the signal light from P2 incident on the objective lens 11 along the optical path D forms an image is denoted by Q2, and a distance between Q2 and the optical axis B is denoted by δ2, the distance δ2 is shown by the following expression (2) similar to expression (1):

$$\delta 2 = f \times d / L2 \quad (2).$$

When the size of the photodetector 12 is denoted by M, and assuming δ2=M, the measurable near distance L2 is shown by the following expression (3):

$$L2 = f \times d / M \quad (3).$$

According to expression (3) it is understood that in order to shorten the distance L2, the size M of the photodetector 12 is made to be large or the focal length f of the detection optical system 30 is made to be short.

When the size of the photodetector 12 is made to be large, the distance L2 can be shortened. However, because of the above-described reason, a signal-to-noise ratio becomes worse by the light except signal light so as to shorten the maximum distance L1, so that it is undesirable.

In the range finder 100 according to the first embodiment, the zoom optical system 14 is disposed between the objective lens 11 and the photodetector 12 of the detection optical system 30, so that it becomes possible to measure up to a near distance by shortening the focal length f.

In FIGS. 1 and 2, when the focal length of the detection optical system 30 is changed from the maximum focal length fL to the minimum focal length fS by moving the negative lens group 14A to the objective lens 11 side, an object position corresponding to the position Q1 of the light source image on the photodetector 12 is denoted by PF, the distance is denoted by LF, the object position corresponding to the position Q2 is denoted by PN, and the distance is denoted by LN, the following expressions are held:

$$LF = (fS/fL) \times L1 \quad (4)$$

$$LN = (fS/fL) \times L2 \quad (5).$$

According to expressions (4) and (5), it is understood that when the focal length f of the detection optical system 30 is changed from fL to fS, the measurable distances LF and LN are varied in proportion to the ratio of focal length.

Moreover, the minimum focal length fS preferably satisfies the following conditional expression (6):

$$(L2/L1) \times fL \leq fS \leq fL \quad (6).$$

Although the upper limit of conditional expression (6) is clear from the spirit of the present invention, the lower limit of conditional expression (6) is for preventing from generation of an area (between L2 and LF) where measurement cannot be carried out since the distance LF becomes shorter than the distance L2 when the focal length of the detection optical system 30 is formed.

Conditional expression (6) is a condition for varying the focal length of the detection optical system 30 discontinuously such that the focal length is changed, for example, in at least two steps from fL to fS. Accordingly, when the zoom optical system 14 is constructed as a zoom lens whose focal length can be varied continuously, the conditional expression (6) is not necessary to be considered.

Regarding conditional expression (6), a case that the focal length is varied in two steps is explained below on behalf of the case.

In FIG. 2, $$d/L1 = \delta 1/fL \quad (7)$$

$$d/LF = \delta 1/fS \quad (8).$$

From these expressions (7) and (8), the following expression (9) is derived:

$$LF = (fS/fL) \times L1 \quad (9).$$

Conditional expression for preventing from generation of an area where measurement cannot be carried out is the following conditional expression (10):

$$L2 \leq LF \quad (10).$$

Accordingly, the following conditional expression (11) is derived from conditional expressions (9) and (10):

$$(L2/L1) \times fL \leq fS \quad (11).$$

The upper limit of fS is the maximum focal length fL, so that fS is necessary to satisfy conditional expression (6).

EXAMPLE 1

When fL=100 mm, d=30 mm, L1=500 m, then δ1=0.006 mm from expression (1). When the size M (length) of the photodetector 12 is to be 0.05 mm, then L2=53.6 m from expression (3).

When the focal length fS=50 mm upon moving the negative lens group 14A in the objective lens 11 direction as shown in FIG. 1, then LF=250 m from expression (4), and LN=26.8 m from expression (5).

As a result, the range finder 100 according to the first embodiment can change measurable distance in near distance side from L2=53.6 m to LN=26.8 m. Accordingly, the range finder 100 can measure distance range from L1=500 m to LN=26.8 m.

EXAMPLE 2

When fL=100 mm, d=30 mm, L1=∞, then δ1=0.0 mm from expression (1). When the size M (length) of the photodetector 12 is to be 0.05 mm, then L2=60 m from expression (3).

When the focal length fS=50 mm upon moving the negative lens group 14A in the objective lens 11 direction as shown in FIG. 1, then LF=∞ from expression (4), and LN=30 m from expression (5).

As a result, the range finder 100 according to the first embodiment can change measurable distance in near distance side from L2=60 m to LN=30 m.

In FIG. 3, A11 denotes a point that an optical axis A is projected on a surface including the imaging surface of the objective lens 11. SA schematically shows a spot size of the signal light, and the photodetector 12 is disposed including at least SA and not becoming excessively larger than SA, so that a signal-to-noise ratio of the signal light can be excellent, farther distance can be measured, and nearer distance can also be measured. Incidentally, in the shape of the photodetector 12, the same effect can be obtained by using a circular shape, an elliptic shape or a quadrilateral shape other than a rectangular shape in addition to a rectangular shape.

[Second Embodiment]

Figure 4:
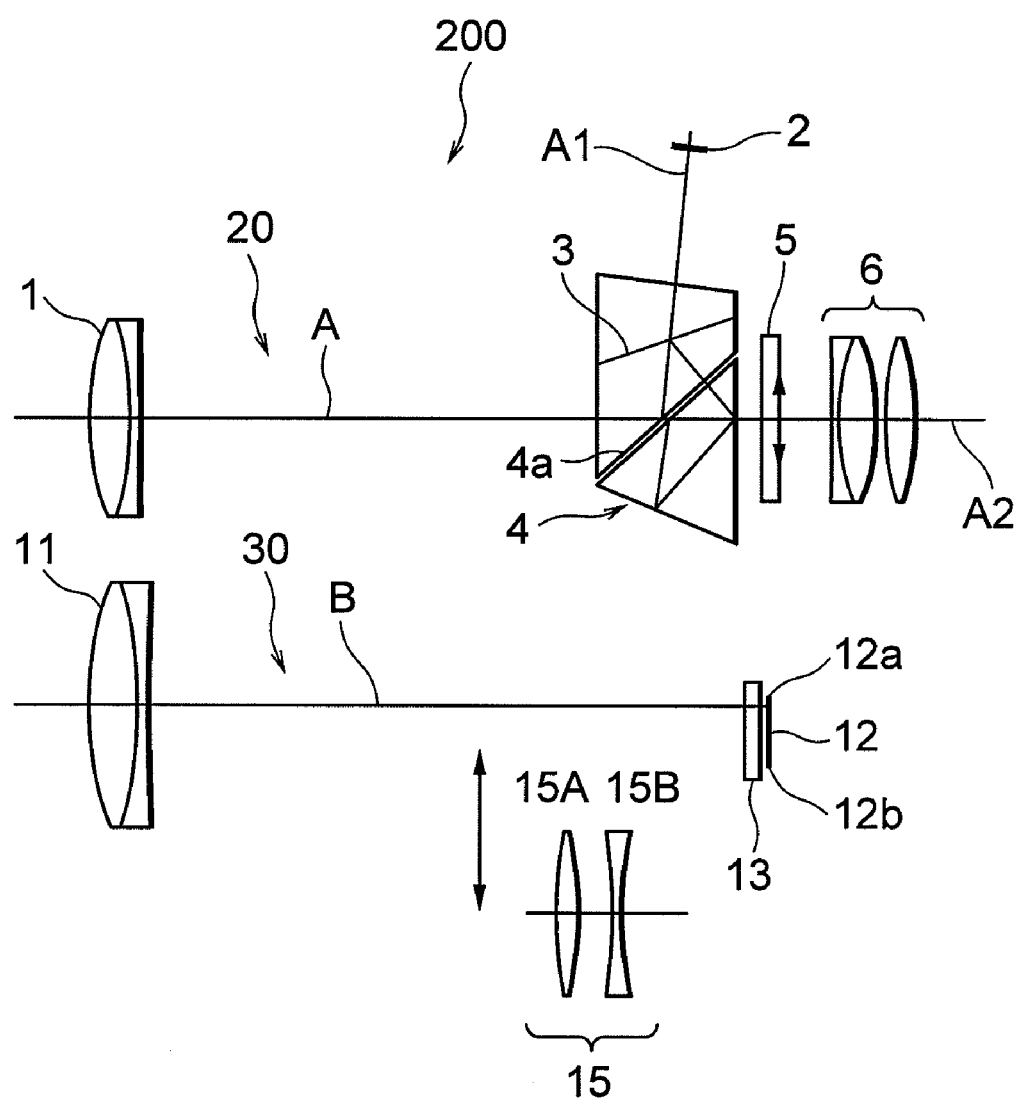
FIG. 4 is a schematic diagram showing an optical system of a range finder according to a second embodiment.

FIG. 4 is a schematic diagram showing an optical system of a range finder 200 according to a second embodiment. The same reference symbol is attached to the similar configuration as the first embodiment, and duplicated explanations are omitted.

In the second embodiment, a zoom optical system 15 is removably inserted between an objective lens 11 of the detection optical system 30 and a photodetector 12.

The zoom optical system 15 includes, in order from the objective lens 11 side, a positive lens group 15A, and a negative lens group 15B. The focal length of the detection optical system can be changed from fL to fS by inserting the zoom optical system 15 into the optical axis B.

The effect of the zoom optical system 15 is similar to that of the first embodiment, so that detailed explanation is omitted. Similar to the first embodiment, it is needless to say that the minimum focal length fS has to satisfy conditional expression (6). The other functions and effects are similar to the first embodiment, so that duplicated explanations are omitted.

[Third Embodiment]

Figure 5:
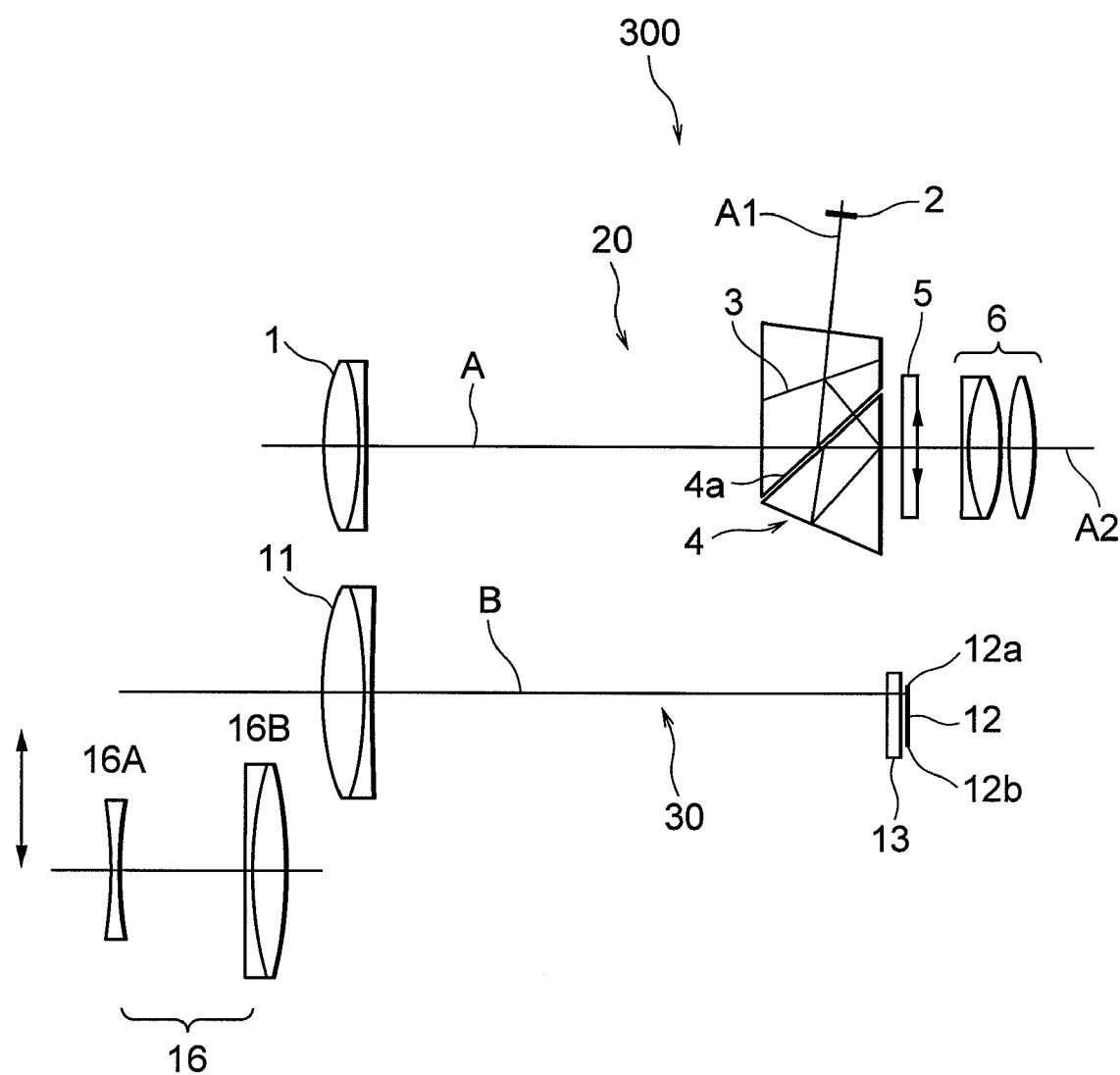
FIG. 5 is a schematic diagram showing an optical system of a range finder according to a third embodiment.

FIG. 5 is a schematic diagram showing an optical system of a range finder 300 according to a third embodiment. The same reference symbol is attached to the similar configuration as the first embodiment, and duplicated explanations are omitted.

In the third embodiment, a zoom optical system 16 is removably disposed to the object side of the objective lens 11 of the detection optical system 30.

The zoom optical system 16 includes, in order from the object side, a negative lens group 16A and a positive lens group 16B, and the focal length of the detection optical system can be changed from fL to fS by fitting the zoom optical system as an afocal optical system removably to the object side of the objective lens 11. The fitting is carried out by a screw or a fitting.

The effect of the zoom optical system 16 is similar to that of the first embodiment, so that detailed explanation is omitted. Similar to the first embodiment, it is needless to say that the minimum focal length fS has to satisfy conditional expression (6). The other functions and effects are similar to the first embodiment, so that duplicated explanations are omitted.

In the above-described first through third embodiments, even if the optical axis A1 of the transmission optical system and the optical axis A2 of the collimation optical system are different with each other, when the optical axis A1 of the transmission optical system and the optical axis B of the detection optical system satisfy the above-described relation, similar effect can be obtained.

Moreover, in the above-described first through third embodiments, although a case that the center of the photodetector 12 is shifted from the optical axis B is explained, even if the center of the photodetector 12 coincides with the optical axis B, when the zoom optical system according to any of the above-described embodiments is disposed therein so as to make measurable distance variable, it is needless to say that measurable distance range can be increased.

Moreover, in a range finder, in addition to the above-described one that the transmission optical system and the detection optical system are separated, there is a one that the transmission optical system and the detection optical system are overlapped coaxially. In the case of coaxial, the position of the target image on the photodetector does not change depending on measuring distance, so that measuring distance range does not limited by the size of the photodetector. However, transmission light and detection light are necessary to be separated by a semi-transparent mirror or the like, so that intensity of the detection light decreases and the maximum measurable distance decreases. On the other hand, in a range finder according to the present embodiment, such a problem does not occur.

As described above, regarding a range finder according to any of the first through third embodiments, even if the size of the photodetector is the same, with varying the focal length of the detection optical system such that when the focal length is long, a distant object is to be measured, and when the focal length is short, the nearest measuring distance can be measured, it becomes possible to accomplish a range finder capable of selecting measurement mode depending on purpose.

[Fourth Embodiment]

Figure 6:
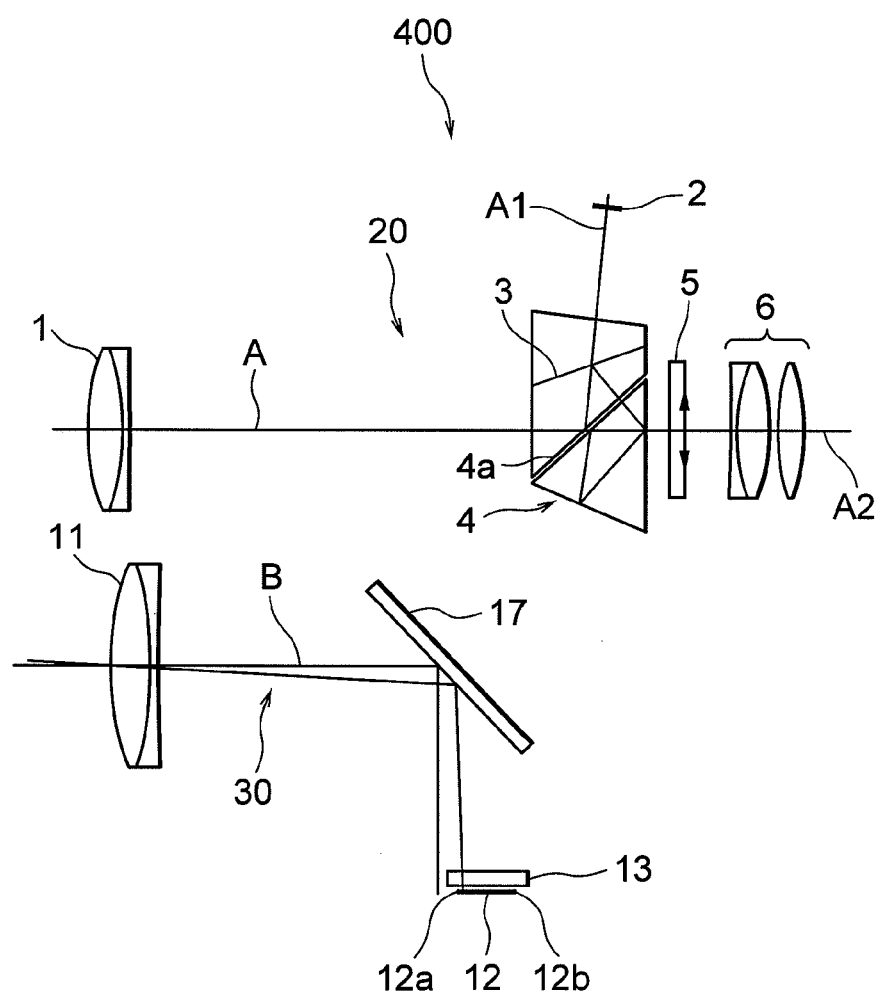
FIG. 6 is a schematic diagram showing an optical system of a range finder according to a fourth embodiment.
Figure 7:
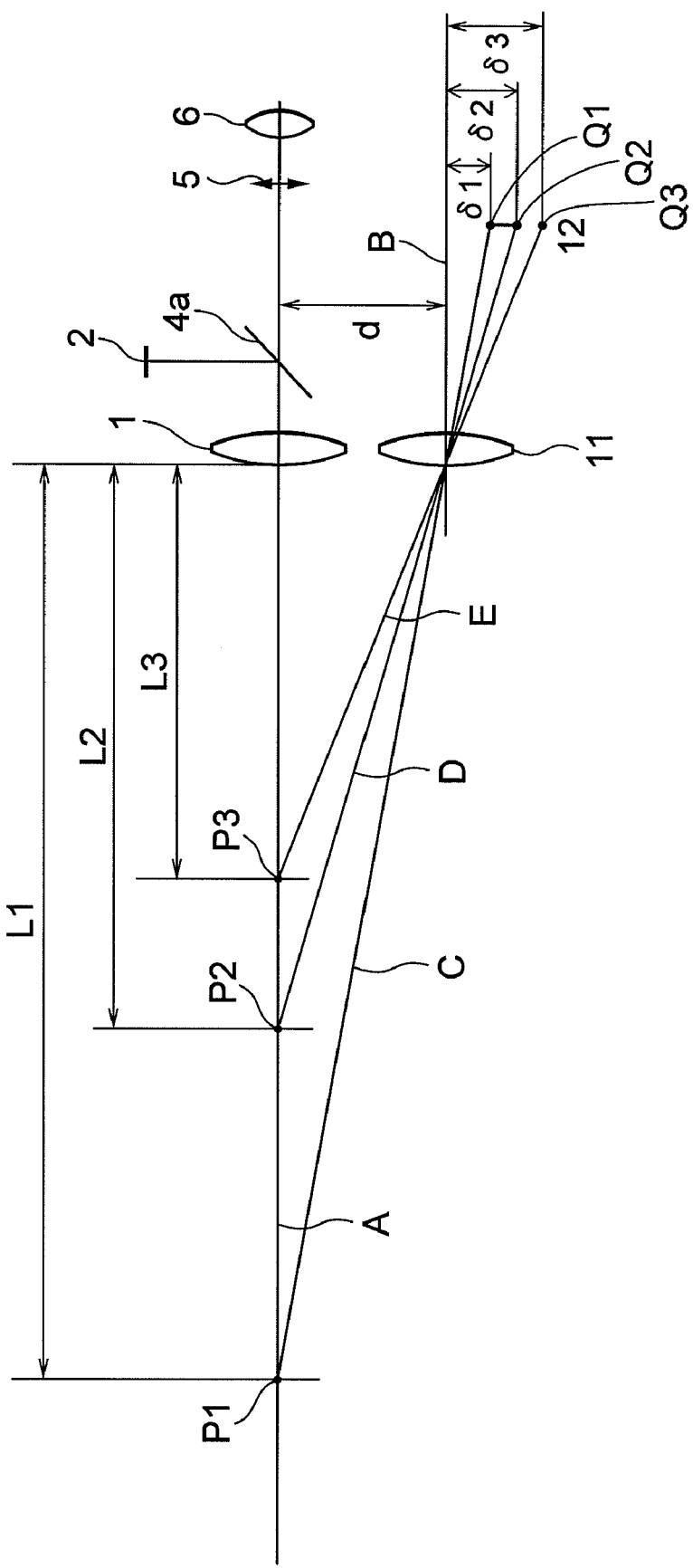
FIG. 7 is a diagram explaining a positional relation of laser spot images from target objects locating different distances on the photodetector of a detection optical system.
Figure 8:
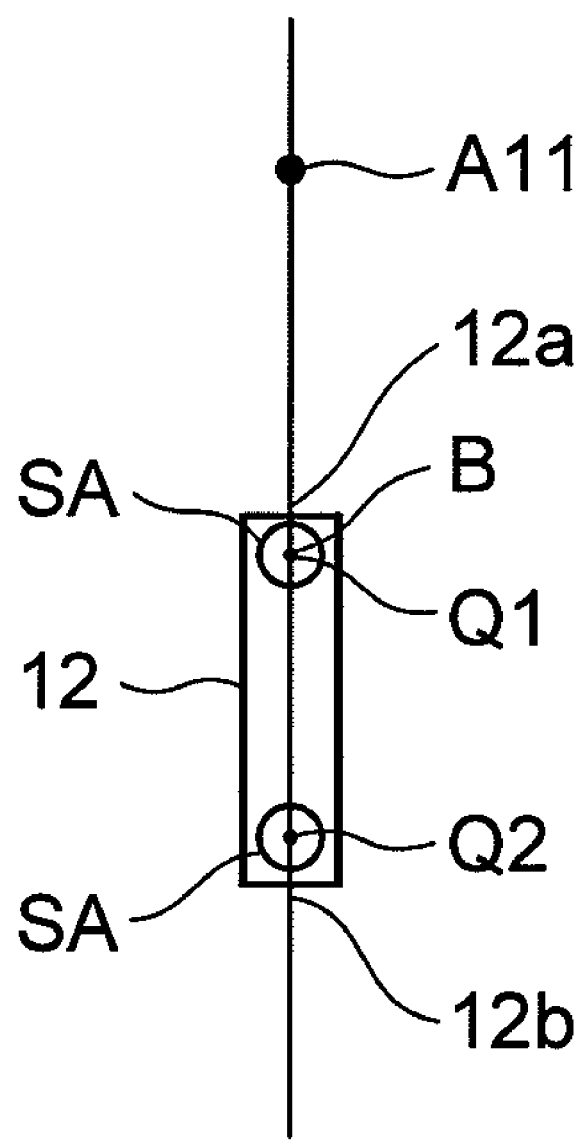
FIG. 8 is a schematic diagram showing each spot image position on the photodetector locating in the vicinity of a line of intersection.

FIG. 6 is a schematic diagram showing an optical system of a range finder according to a fourth embodiment. FIG. 7 is a diagram explaining a function of the range finder according to the fourth embodiment. FIG. 8 is a schematic diagram showing each spot image position on the photodetector. The same reference symbol is attached to the similar configuration as the first embodiment, and duplicated explanations are omitted.

In the fourth embodiment, a mirror 17 for deflecting the optical axis B of the detection optical system 30 is provided between the objective lens 11 and the photodetector 12 of the detection optical system 30 with tilting a given angle. The position of the spot image on the photodetector 12 can be varied by varying the tilt angle of the mirror 17 by a given angle (angle α in FIG. 9B) from the tilt angle.

In this manner, a range finder 100 [sic] is constructed.

In a range finder 400 according to the fourth embodiment, the center position of the photodetector 12 is an imaging surface of the detection optical system 30, and is shifted in a direction from an image forming position of the signal light from a distant object to an image forming position of the signal light from a near distance object as described later. As shown in FIGS. 7 and 8, on the imaging surface of the detection optical system 30, the center of the photodetector 12 is disposed such that one end portion 12a of the photodetector 12 is disposed in the vicinity of the optical axis B, and the other end portion 12b comes away from the optical axis B. Moreover, measurable distance range can be increased by the mirror 17 as described later.

Although the photodetector 12 is disposed perpendicular to the optical axis B of the detection optical system 30, it is not necessary to be perpendicular, and the photodetector 12 is preferably disposed with tilting to, for example, the best focus position of the spot image corresponding to the nearest distance.

The position of the photodetector 12 and measurable distance range of the range finder 100 [sic] according to the fourth embodiment will be explained below with reference to FIGS. 7 and 8. The explanation is carried out with attaching the same symbol to the similar configuration as FIG. 6.

In FIG. 7, signal light emitted from the light source 2 is reflected by a dichroic mirror 4a that is disposed in the erecting prism 4, transmits visible light, and reflects signal light, and then reaches the target object P1 (the longest measurable distance) to P2 through the objective lens 1. The explanation is carried out without illustrating the erecting prism 4 shown in FIG. 6.

The signal light is scattered by the object P1 and a portion thereof is incident on an objective lens 11 of the detection optical system 30. The signal light proceeds along a line C joining the center of P1 and the center of the objective lens 11, forms an image at a point Q1 in the vicinity of the optical axis B on the photodetector 12 disposed near to the imaging surface of the objective lens 11, and a distance to the target object P1 is calculated on the basis of the time difference between the transmission time and the detection time.

When the distance to the object P1 is denoted by L1, an amount of shift δ1 of the point Q1 from the optical axis B is shown by expression (1):

$$\delta 1 = f \times d / L1 \quad (1)$$

where f denotes a focal length of the objective lens 11, and d denotes a distance between the optical axis A and the optical axis B.

When the distance L1 is sufficiently large in comparison with the distance d, d/L1 becomes substantially zero, and δ1 also becomes substantially zero. This means that the point Q1 exists on the optical axis B. Accordingly, in consideration of measurement up to a long distance L1 in comparison with d, one end portion 12a of the photodetector 12 is preferably disposed on the optical axis B. However, when a limit is provided to the distance L1 in consideration of a reaching distance of the signal light or detection intensity of the signal light, the one end portion 12a of the photodetector 12 may be disposed slightly away from the optical axis B in accordance with expression (1).

On the other hand, a position where the signal light from P2 incident on the objective lens 11 along the optical path D forms an image is denoted by Q2, and a distance between Q2 and the optical axis B is denoted by δ2, the distance δ2 is shown by the following expression (2) similar to expression (1):

$$\delta 2 = f \times d / L2 \quad (2)$$

When the size of the photodetector 12 is denoted by M, and assuming δ2=M, the measurable near distance L2 is shown by the following expression (3):

$$L2 = f \times d / M \quad (3)$$

According to expression (3) it is understood that in order to shorten the distance L2, the size M of the photodetector 12 is made to be large.

When the size of the photodetector 12 is made to be large, the distance L2 can be shortened. However, because of the above-described reason, a signal-to-noise ratio becomes worse by the light except signal light so as to shorten the maximum distance L1, so that it is undesirable.

Moreover, when an object P3 locating nearer than the distance L2 is tried to be measured, the spot image of the signal light from the object P3 is formed at the position Q3 (the distance from the optical axis B is to be δ3 on the imaging surface of the photodetector 12, and δ3 is expressed by the following expression (12):

$$\delta 3 = f \times d / L3 \quad (12)$$

Since the position Q3 of δ3 does not exist on the photodetector 12, the position Q3 cannot be measured with this configuration.

In a range finder 400 according to the fourth embodiment, the mirror 17 is provided between the objective lens 11 and the photodetector 12 of the detection optical system 30, and with deflecting the optical axis B by the mirror 17, it becomes possible to form a spot image on the photodetector 12, so that nearer distance can be measured.

Figure 9A:
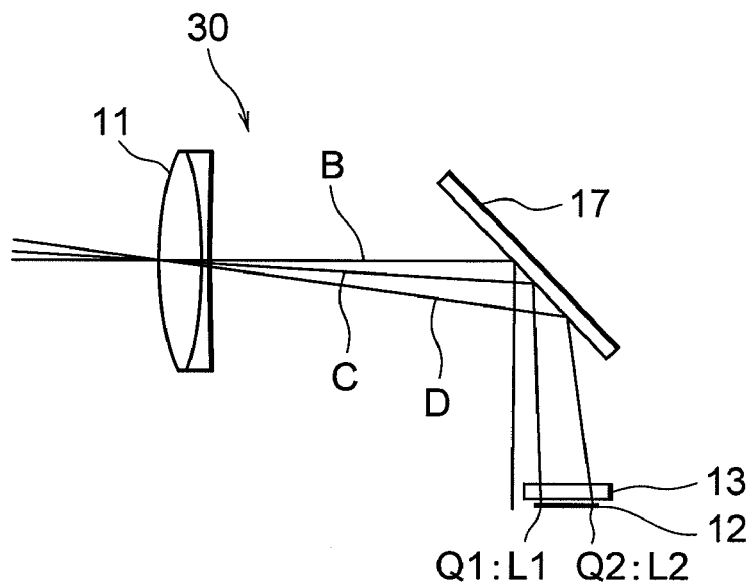
FIGS. 9A and 9B are diagrams explaining an effect of inclination of a mirror.
Figure 9B:
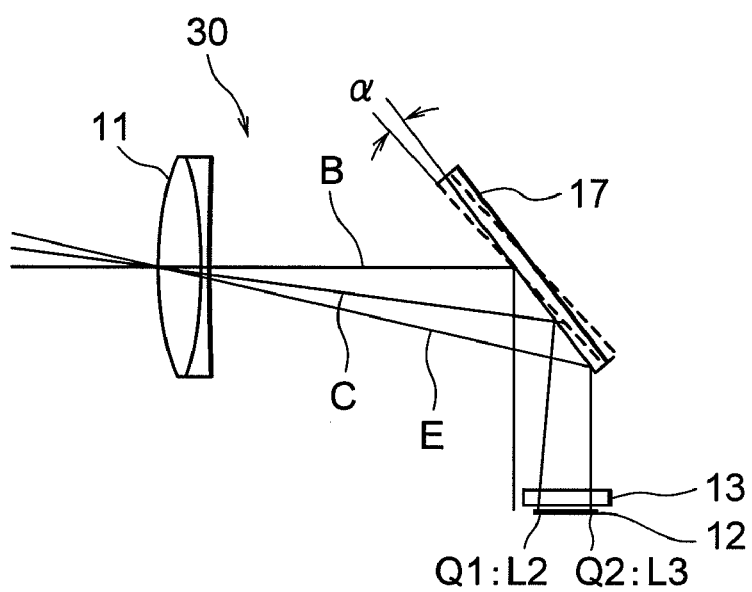

FIGS. 9A and 9B are diagrams explaining an effect of inclination of a mirror 17. FIG. 9A shows a state for measuring a distance between the distance L1 and the distance L2. FIG. 9B shows a state for measuring a distance between the distance L2 and the distance L3.

In FIG. 9A, the mirror 17 is held in a state where the mirror 17 makes a given angle with the optical axis B. In this state, the signal light from the distance L1 is incident along the optical axis C, reflected by the mirror 17, and forms an image at Q1 on the photodetector 12. Signal light from the distance L2 is incident along the optical axis D, reflected by the mirror 17, and forms an image at Q2 on the photodetector 12. In this manner, the range finder 400 can measure a distance of an object located between the distance L1 and the distance L2.

Then, when an object located nearer than the distance L2 is to be measured, the range finder 400 operates an unillustrated member to tilt the mirror 17 by the amount of a given angle α with the optical axis B. As a result, signal light from the distance L2 is reflected by the mirror 17, and forms an image at the position Q1 on the photodetector 12, and signal light from the distance L3 is reflected by the mirror 17, and forms an image at the position Q2 on the photodetector 12. In this manner, with tilting the mirror 17 by a given angle α, imaging position Q2 of the distance L2 before tilting can be deflected to imaging position Q1 after tilting, and imaging position Q3 of the distance L3 before tilting can be deflected to imaging position Q2 after tilting. As a result, measurable distance range of the range finder 400 can be changed to the range from the distance L2 to the distance L3.

In this instance, the relation between the distance L3 and the distance L2 is show by the following expression (13):

$$L3 = \delta 2 / (2\delta 2 - \delta 1) \times L2 \quad (13)$$

Specific examples are shown below.

EXAMPLE 3

In a range finder, when f=100 mm, d=30 mm, L1=500 m, and L2=100 m, then δ1=0.006 mm from expression (1), δ2=0.03 mm from expression (2), and by tilting mirror 17 from expression (13) L3=55.6 m. Accordingly, with tilting the mirror 17, it becomes possible to measure the distance between L2=100 m and L3=55.6 m.

Therefore, with tilting the mirror 17, the range finder according to Example 3 can measure the distance range from L1=500 m to L3=55.6 m.

EXAMPLE 4

In a range finder, when f=50 mm, d=30 mm, L1=∞, and L2=50 m, then δ1=0 mm from expression (1), δ2=0.03 mm from expression (2), and by tilting mirror 17 from expression (13), it becomes possible to measure the distance from L2=50 m to L3=25 m. Accordingly, with tilting the mirror 17, the range finder according to Example 4 makes it possible to measure the distance between L1=∞ and L3=25 m.

As described above, although before tilting the mirror, the measurable distance range was from L1 to L2, after tilting the mirror, the measurable distance range becomes from L2 to L3.

Accordingly, when the distance to the object P3 is to be measured, it becomes possible to measure the distance by tilting the mirror 17.

Incidentally, tilt angle $\alpha$ of the mirror 17 is set to an amount that the corresponding image position Q2 on the photodetector 12 of the target object P2 is moved to the position Q1. When the mirror 17 is further tilted exceeding the amount, a distance of a nearer object than the target object P3 can be measured. However, the spot image of the target object P2 on the photodetector 12 becomes larger than the size of the photodetector 12, so that a distance range that cannot be measured generates. In order to avoid this, the tilt angle $\alpha$ of the mirror 17 is preferably set such that the spot image of the target object P2 does not exceed the size of the photodetector 12. In other words, the tilt angle $\alpha$ of the mirror 17 is preferably set such that measurable distance range is from the object P1 to the object P2 before tilting, and from the object P2 to the object P3 after tilting, thus both including the object P2.

In the fourth embodiment, although deflection direction of the optical axis B by the mirror 17 is set to a direction away from the optical axis A in the plane formed by the optical axes A and B, deflection direction is not limited to this, and may be in a direction crossing the optical axis A. With deflecting in a direction crossing the optical axis A, the range finder 400 can be constructed more compact. Or in a plane perpendicular to the optical axis B, deflection direction can be set to any direction centered on the optical axis B, so that it may suitably be set upon designing the range finder 400.

Moreover, in order not to tilt inadvertently, the mirror 17 preferably includes lock mechanisms to fix the tilt angle at the start position and the end position.

[Fifth Embodiment]

Figure 10:
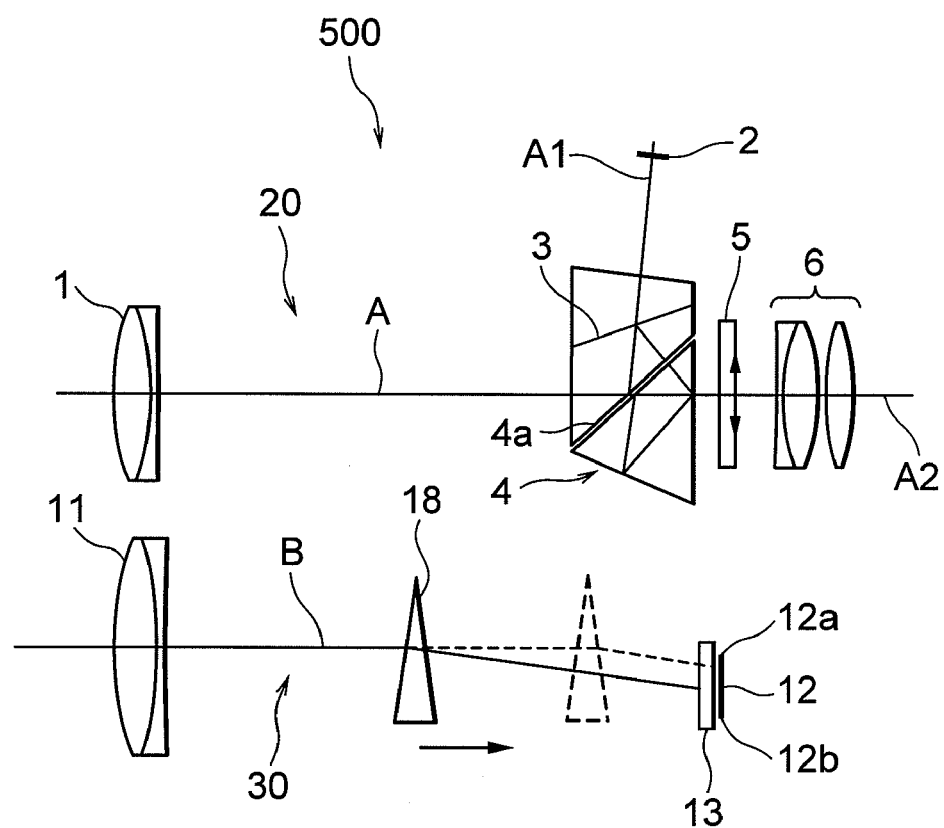
FIG. 10 is a schematic diagram showing an optical system of a range finder according to a fifth embodiment.

FIG. 10 is a schematic diagram showing an optical system of a range finder 500 according to a fifth embodiment. The same reference symbol is attached to the similar configuration as the first embodiment, and duplicated explanations are omitted.

In the fifth embodiment, a deflection angle prism 18 is provided between the objective lens 11 and the photodetector 12 of the detection optical system 30, and with moving the deflection angle prism 18 along the optical axis, the optical axis B of the detection optical system 30 is constructed movable in a plane including the optical axis A and the optical axis B.

Figure 11A:
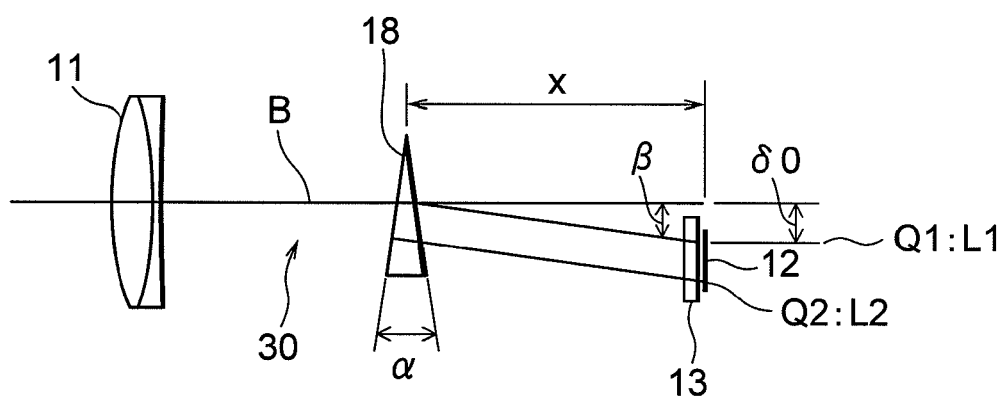
FIGS. 11A and 11B show only a detection optical system explaining an effect of a deflection angle prism.
Figure 11B:
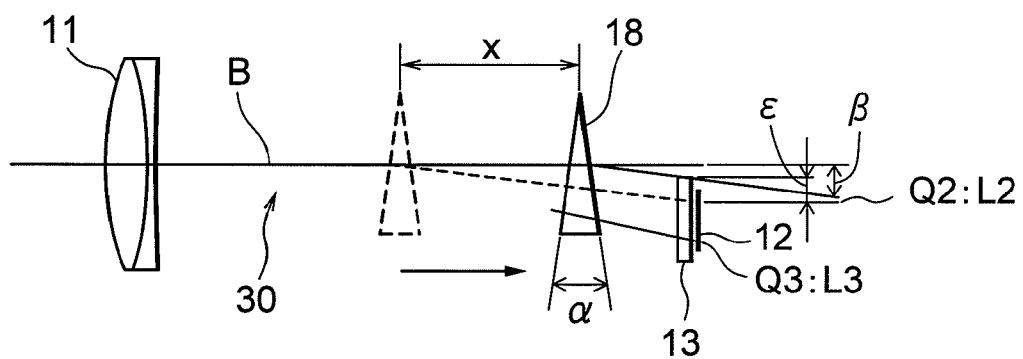

FIGS. 11A and 11B show only a detection optical system explaining an effect of a deflection angle prism 18. FIG. 11A shows an initial position, and measuring from L1 to L2 shown in FIG. 7. FIG. 11B shows a case upon moving the deflection angle prism, and measuring from L2 to L3 shown in FIG. 7.

In FIGS. 11A and 11B, before moving the deflection angle prism 18, an imaging position of the signal light from P1 incident on the detection optical system 30 is Q1, and an imaging position of the signal light from P2 is Q2, so that in the range finder 500, measurable distance range is set between L1 and L2.

Then, in order to make the range between L2 and L3 measurable, the deflection angle prism 18 is moved to the photodetector 12 side along the optical axis B. Accordingly, the imaging position of the signal light from P2 moves to Q1, the imaging position of the signal light from P3 moves to Q2, so that it becomes possible to detect signal light by the photodetector 12. As a result, the range finder 500 makes it possible to measure the distance range from L2 to L3.

In FIGS. 11A and 11B, the following expression (14) is satisfied:

$$\beta = (n-1) \times \alpha \qquad (14)$$

where $\beta$ denotes a tilt angle of the optical axis by the deflection angle prism 18, n denotes a refractive index of the deflection angle prism 18, and $\alpha$ denotes a vertex angle of the deflection angle prism 18.

When the deflection angle prism 18 is moved to the photodetector 12 side along the optical axis B by the amount of Z, a moving amount $\epsilon$ of the optical axis is shown by the following expression (15):

$$\epsilon = \beta Z = (n-1) \times \alpha \times Z \qquad (15).$$

Accordingly, with moving the deflection angle prism 18, a margin $\epsilon$ is generated on the photodetector 12, so that a nearer object can be measured by just that much.

Although the similar effect can be accomplished by moving the photodetector 12 or by providing a plurality of photodetectors, moving the photodetector together with a substrate generates difficulty in accuracy, and the apparatus becomes mechanically large.

When a plurality of photodetectors are provided, the substrate is not necessary to move. However, since the photodetectors cannot be brought nearer without a gap, a distance range that is corresponding to the gap and is unable to be measured is generated, so that it is undesirable.

A lock mechanism for fixing the moving position of the deflection angle prism 18 is preferably included.

In the fourth and the fifth embodiments, although cases that the center of the photodetector 12 is shifted from the optical axis B are explained, even if the center of the photodetector 12 coincides with the optical axis B, it is needless to say that with providing an optical axis deflecting member according to the fifth embodiment, the measurable distance can be varied.

Moreover, in a range finder, in addition to the above-described one that the transmission optical system and the detection optical system are separated, there is a one that the transmission optical system and the detection optical system are overlapped coaxially. In the case of coaxial, the position of the target image on the photodetector does not change depending on measuring distance, so that measuring distance range does not limited by the size of the photodetector. However, transmission light and detection light are necessary to be separated by a semi-transparent mirror or the like, so that intensity of the detection light decreases and the maximum measurable distance decreases. On the other hand, in a range finder according to the fifth embodiment, such a problem does not occur.

As described above, in a range finder according to any of the fourth and the fifth embodiments, even if the size of the photodetector is the same, with providing optical member for deflecting optical axis of the detection optical system and with moving or tilting the member, it becomes possible to vary the image forming position of the signal light on the photodetector. In particular, with expanding the near distance side of the measurable distance range, it becomes possible to measure distance from an object locating at farther distance to an object locating nearest distance, so that it becomes possible to accomplish a range finder capable of selecting measurement mode depending on purpose.

[Sixth Embodiment]

Figure 12:
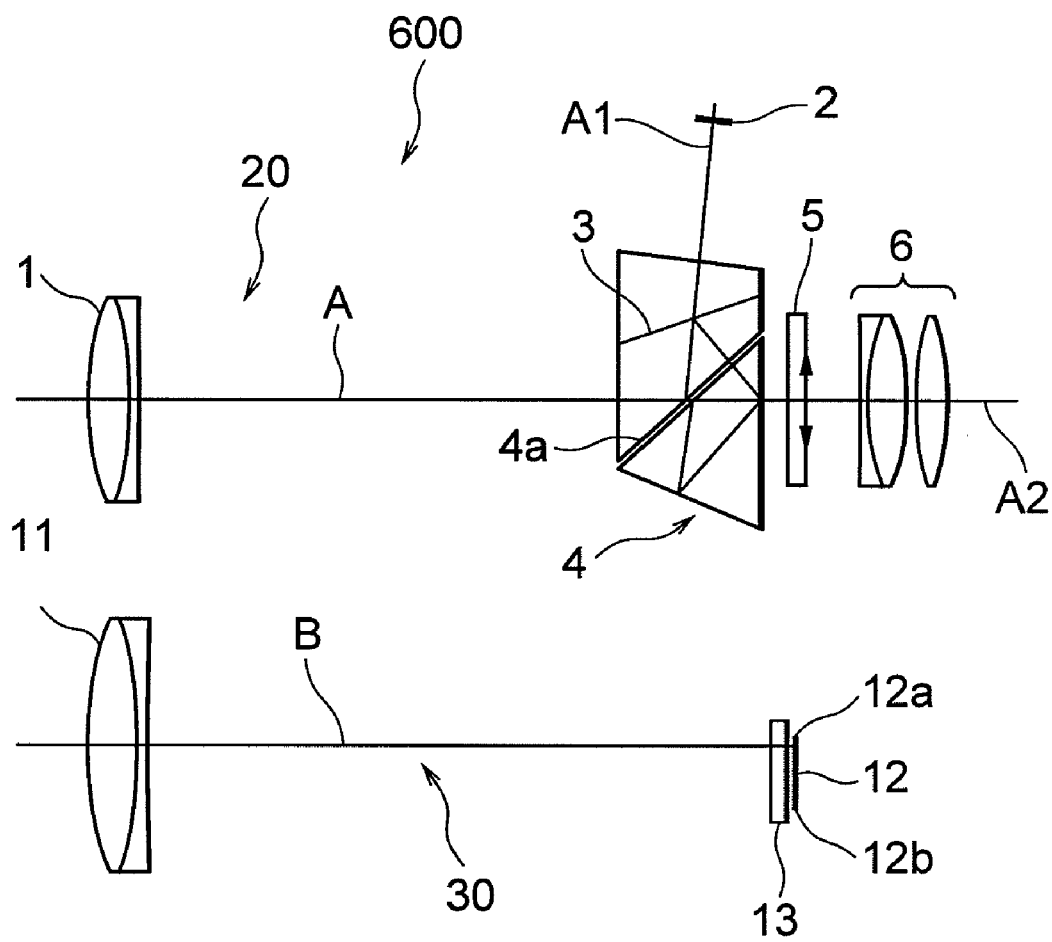
FIG. 12 is a schematic diagram showing an optical system of a range finder according to a sixth embodiment.
Figure 13:
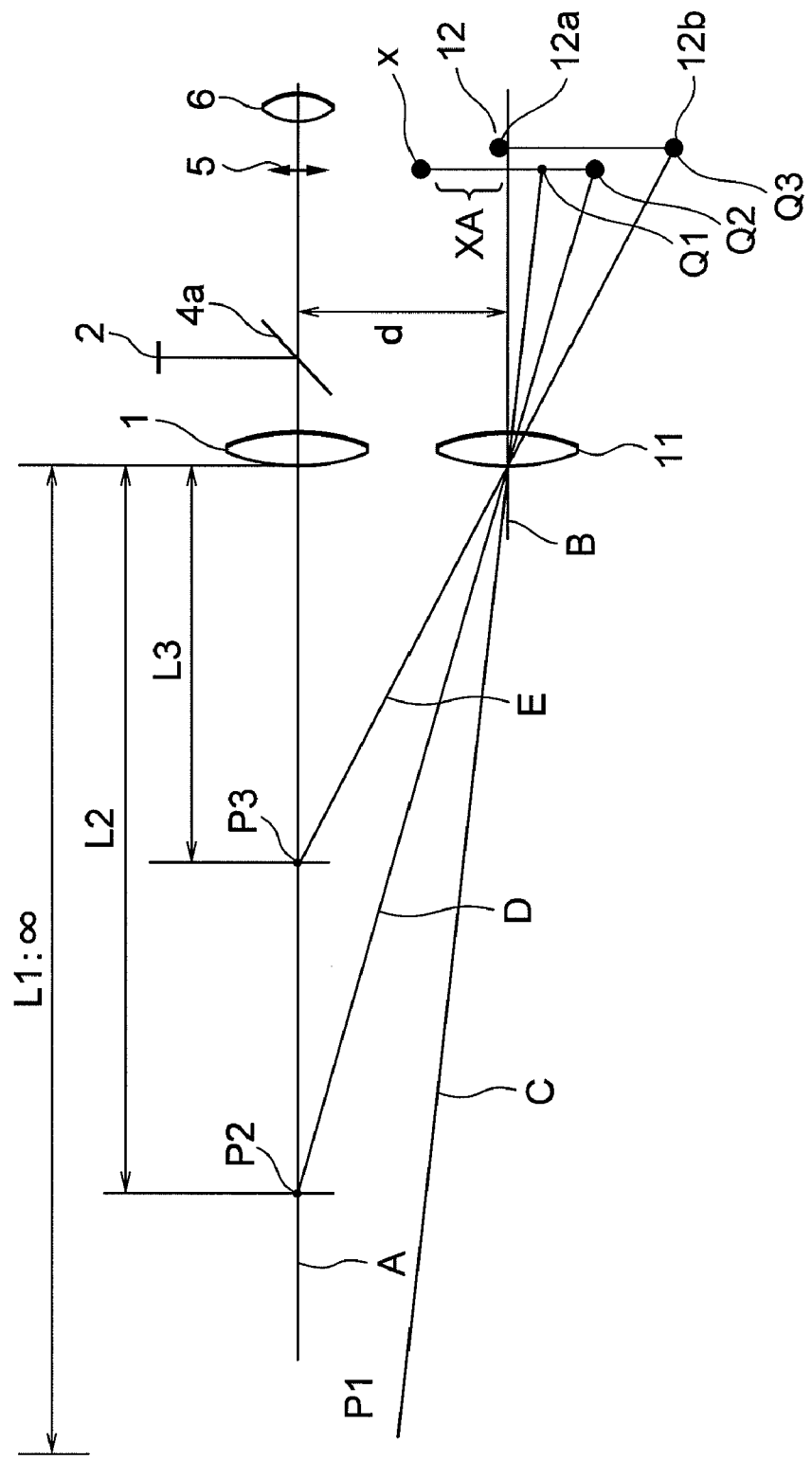
FIG. 13 is a diagram explaining a positional relation of laser spot images from target objects locating different distances on the photodetector of a detection optical system.
Figure 14:
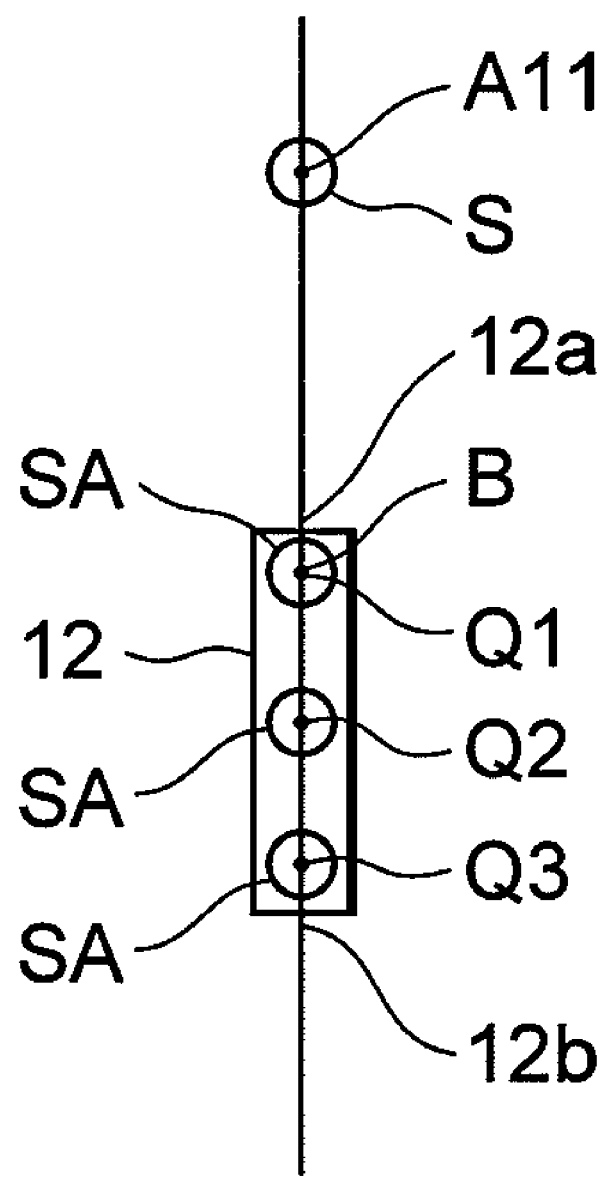
FIG. 14 is a schematic diagram showing each spot image position on the photodetector.

A range finder 600 according to a sixth embodiment of the present invention is explained below with reference to accompanying drawings. The same reference symbol is attached to the similar configuration as the first embodiment, and duplicated explanations are omitted. FIG. 12 is a schematic diagram showing an optical system of a range finder according to a sixth embodiment. FIG. 13 is a diagram explaining a positional relation of spot images of the signal light from target objects locating different distances on the photodetector of a detection optical system. FIG. 14 is a schematic diagram showing the photodetector and each spot image position.

In the range finder according to the sixth embodiment, the center position of the photodetector 12 is an imaging surface of the detection optical system 30, and is shifted along a direction from an imaging position of the signal light reflected from a distant object to an imaging position of the signal light reflected from a near distance object as described later. As shown in FIGS. 13 and 14, an end portion 12a of the photodetector 12 is positioned in the vicinity of the optical axis B, and the other end portion 12b is positioned away from the optical axis B on the imaging surface of the detection optical system 30. With disposing the photodetector 12 shifting in this manner, it becomes possible to increase the measurable distance range as described later.

Moreover, although the photodetector 12 is disposed perpendicular to the optical axis B, it is not necessary to be perpendicular; the position of the photodetector 12 is preferably disposed at the best image position of the spot image.

The position of the photodetector 12 and the measurable distance range of the range finder 600 according to the sixth embodiment are explained below with reference to FIGS. 13 and 14.

In FIG. 13, the signal light emitted from the light source 2 is reflected by a mirror 4a that is disposed in the erecting prism 4, transmits visible light, and reflects signal light, and reaches from the target object P1 (the farthest measurable distance) to P3 (near target object) through the objective lens 1. Incidentally, the explanation is carried out without illustrating the erecting prism 4 shown in FIG. 12.

Signal light irradiating the distant target object P1 is reflected (scattered) by the object P1, and a portion thereof is incident on the objective lens 11 of the detection optical system 30. The signal light proceeds along a straight line C joining the center of the P1 and the center of the objective lens 11, forms an image at a point Q1 in the vicinity of the optical axis B on the photodetector 12 disposed in the vicinity of the imaging surface of the objective lens 11, and a distance to the target object P1 is calculated by the time difference between the transmission time and the detection time.

When the distance to the object P1 is denoted by L1, an amount of shift $\delta 1$ of the point Q1 from the optical axis B is shown by expression (1):

$$\delta 1 = f \times d / L1 \quad (1)$$

where f denotes a focal length of the objective lens 11, and d denotes a distance between the optical axis A and the optical axis B.

When the distance L1 is sufficiently large in comparison with the distance d, d/L1 becomes substantially zero, and $\delta 1$ also becomes substantially zero. This means that the point Q1 exists on the optical axis B. Accordingly, in consideration of measuring up to a long distance L1 in comparison with d, one end portion 12a of the photodetector 12 is preferably disposed on the optical axis B. However, when a limit is provided to the distance L1 in consideration of a reaching distance of the signal light or detection intensity of the signal light, the one end portion 12a of the photodetector 12 may be disposed slightly away from the optical axis B in accordance with expression (1).

On the other hand, a position where the signal light from P2 incident on the objective lens 11 along the optical path D forms an image is denoted by Q2, and a distance between Q2 and the optical axis B is denoted by $\delta 2$, the distance $\delta 2$ is shown by the following expression (2) similar to expression (1):

$$\delta 2 = f \times d / L2 \quad (2).$$

Similarly, the signal light from an object P3 located at the nearest distance L3 incident on the objective lens 11 along the optical path D forms an image at a point Q3, and $\delta 3$ denotes a distance between Q3 and the optical axis B is denoted by $\delta 3$, the distance $\delta 3$ is shown by the following expression (12):

$$\delta 3 = f \times d / L3 \quad (12).$$

When the photodetector 12 is disposed with the center thereof coinciding with the optical axis B as in the conventional case (see the reference symbol X in FIG. 13), since the size of the photodetector 12 only covers from the imaging point Q1 to the imaging point Q2, the measurable distance range is limited to L1 through L2, so that the nearest distance L3 cannot be measured. Moreover, since an area of the photodetector 12 locating to the optical axis A side of the optical axis B (as shown by "XA" in FIG. 13) exists, a signal-to-noise ratio inevitably becomes worse by light other than signal light, so that the maximum measurable distance L1 further becomes short.

When the size of the photodetector 12 is made large in the conventional configuration of the photodetector 12, although the nearest distance object P3 can be measured, the above-described area locating to the optical axis A side of the optical axis B becomes large. Accordingly, a signal-to-noise ratio inevitably becomes worse by light other than signal light, as a result, the maximum measurable distance L1 further becomes short, so that it is undesirable.

In the range finder 600 according to the sixth embodiment, as shown in FIGS. 13 and 14, the center of the photodetector 12 is shifted such that an end portion 12a of the photodetector 12 having the same size is disposed in the vicinity of the optical axis B and the other end portion 12b is disposed away from the optical axis B, so that the signal light from the near object P3 can be formed an image on the photodetector 12. As a result, with only shifting the center position of the photodetector 12, it becomes possible to measure from a distant object to a near object in comparison with a conventional range finder.

Here, the size of the photodetector 12 is to be 2M, the measurable near distance in the conventional range finder is f×d/M. On the other hand, in the range finder 600 according to the sixth embodiment, the measurable near distance becomes f×d/2M, so that approximately up to a half distance can be measured.

For example, the focal length of the objective lens 11 is f=100 mm, the distance between the optical axis A and the optical axis B is d=30 mm, the size of the photodetector 12 is 2M=0.5 mm, then, the measurable nearest distance in the conventional configuration is 12 m. On the other hand, the measurable nearest distance in the range finder 600 can be shortened to a half of 6 m.

In FIG. 14, reference symbol "A11" shows a point that the optical axis A is projected on a plane including the imaging plane of the objective lens 11. "S" and "SA" schematically show the spot size of the signal light, respectively, and the photodetector 12 is disposed including at least SA, with controlling the size of the photodetector 12 not to become too large in comparison with SA, a signal-to-noise ratio of the signal light can be made excellent, so that near distance can be measured with making it possible to measure the distance farther away. Incidentally, the same effect can be obtained by using a circular shape, an elliptic shape or a quadrilateral shape other than a rectangular shape to the shape of the photodetector 12 in addition to a rectangular shape.

Even if the optical axis A1 of the transmission optical system and the optical axis A2 of the collimation optical system are different with each other, when the optical axis A1 of the transmission optical system and the optical axis B of the detection optical system satisfy the above-described relation, similar effect can be obtained.

Moreover, in a range finder, in addition to the above-described one that the transmission optical system and the detection optical system are separated, there is a one that the transmission optical system and the detection optical system are overlapped coaxially. In the case of coaxial, the position of the target image on the photodetector does not change depending on measuring distance, so that measuring distance range does not limited by the size of the photodetector. However, transmission light and detection light are necessary to be separated by a semi-transparent mirror or the like, so that intensity of the detection light decreases and the maximum measurable distance decreases. On the other hand, in a range finder according to the sixth embodiment, such a problem does not occur.

As described above, according to the range finder of the sixth embodiment, with disposing the center of the photodetector 12 with shifting away from the optical axis B of the detection optical system, it becomes possible to provide a range finder capable of measuring up to a further nearer distance with using the same size photodetector 12 as the conventional one, and capable of measuring the same distance as the conventional one in the distant object.

The above-described each embodiment only shows specific example, so that the present invention is not limited to the above-described shapes and configurations, and may suitably be altered and changed within the scope of the present invention.

What is claimed is:

1. A range finder comprising:
   a transmission optical system that transmits signal light toward a target object;
   a detection optical system that has a different optical axis from that of the transmission optical system and detects the signal light reflected from the target object; and
   a photodetector that is disposed on an imaging surface of the detection optical system; and
   a distance to the target object being measured on the basis of a time difference between a transmission time and a detection time of the signal light,
   wherein said range finder further comprises a variable focal length optical system that makes a focal length of the detection optical system variable in accordance with a distance to the target object, and
   wherein said variable focal length optical system satisfies the following conditional expression:

$$(L2/L1) \times fL \leq fS \leq fL$$

where fL denotes the maximum focal length of the detection optical system varied by the variable focal length optical system, fS denotes the minimum focal length of the detection optical system varied by the variable focal length optical system, L1 denotes maximum distance to an object to be measured, and L2 denotes the minimum distance to an object to be measured.

2. The range finder according to claim 1, wherein the variable focal length optical system includes a zoom optical system that is disposed between an objective lens of the detection optical system and the photodetector.

3. The range finder according to claim 1, wherein the variable focal length optical system is an optical system that is removably disposed between an objective lens of the detection optical system and the photodetector.

4. The range finder according to claim 1, wherein the variable focal length optical system includes an optical system that is removably disposed to the object side of an objective lens of the detection optical system.

5. The range finder according to claim further comprising:
   a collimation optical system.

* * * * *